(12) United States Patent
Sato

(10) Patent No.: US 7,019,428 B2
(45) Date of Patent: Mar. 28, 2006

(54) INDUCTION MOTOR AND ROTOR THEREFOR

(75) Inventor: Toshihiro Sato, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/912,383

(22) Filed: Aug. 5, 2004

(65) Prior Publication Data

US 2005/0040726 A1     Feb. 24, 2005

(30) Foreign Application Priority Data

Aug. 18, 2003  (JP) ............................. 2003-294650

(51) Int. Cl.
*H02K 17/16*   (2006.01)
*H02K 21/00*   (2006.01)

(52) U.S. Cl. ...................... 310/211; 310/261
(58) Field of Classification Search ............... 310/211, 310/212, 261
See application file for complete search history.

(56) References Cited

U.S. PATENT DOCUMENTS

| | | | | |
|---|---|---|---|---|
| 1,375,461 A | * | 4/1921 | Kimble | ................. 310/211 |
| 4,970,424 A | * | 11/1990 | Nakamura et al. | .......... 310/262 |
| 5,422,527 A | * | 6/1995 | Lazzaro | ...................... 310/211 |
| 2004/0113508 A1 | * | 6/2004 | Yasuhara et al. | ........... 310/211 |

FOREIGN PATENT DOCUMENTS

| | | | | |
|---|---|---|---|---|
| JP | 361224846 | * | 3/1985 | ................. 310/211 |
| JP | 01-122351 | | 5/1989 | |
| JP | 5-50981 | | 7/1993 | |
| JP | 02002291211 | * | 10/2002 | ................. 310/211 |

* cited by examiner

*Primary Examiner*—Tran Nguyen
(74) *Attorney, Agent, or Firm*—Marsh Fischmann & Breyfogle LLP

(57) ABSTRACT

A rotor for an induction motor. The rotor includes a core, a pair of end rings, and a plurality of aluminum conducting members. The core includes a plurality of accommodating holes that are aligned circumferentially in a peripheral portion of the core. The accommodating holes extend from one end surface of the core to the other. The end rings are formed of aluminum alloy. Each of the end rings has a plurality of support holes corresponding to the accommodating holes. The support holes are aligned circumferentially in a peripheral portion of each end ring. The end rings are each disposed at a corresponding one of the opposing ends of the core such that the support holes are opposed to the accommodating holes. Each of the conducting members is received in a corresponding one of the accommodating holes and the associated support holes. Each conducting member is supported by each of the end rings at a support portion located in the corresponding support hole.

15 Claims, 6 Drawing Sheets

INDUCTION MOTOR AND ROTOR THEREFOR

BACKGROUND OF THE INVENTION

1. Field of the Invention

The present invention relates to induction motor rotors and rotors therefor, and, more particularly, to induction motors having a cage rotor.

2. Description of Related Art

Conventionally, cage rotors are employed in induction motors, as described in, for example, Japanese Laid-Open Utility Model Publication No. 5-50981. A cage rotor includes a substantially cylindrical iron core, a plurality of aluminum conducting members, and a pair of aluminum end rings. The core is formed by laminating a plurality of disk-like core sheets, each of which is configured by a silicon steel sheet. A plurality of axial through holes are formed in a peripheral portion of the core. Each of the aluminum conducting bars is fitted in a corresponding one of the through holes. The end rings bind the corresponding ends of the aluminum conducting bars together, thus forming a cage shape.

If the induction motor including the cage rotor is used for, for example, a turbocharger as in Japanese Laid-Open Patent Publication No. 1-122351, the induction motor must tolerate high-speed rotation, which may reach 100,000 rpm. More specifically, in this case, relatively large centrifugal force acts on the cage rotor. Therefore, relatively large tensile force acts on each of the end rings in a radial outward direction. It is thus required that the end rings have relatively high rigidity.

However, conventionally, the end ring of the cage rotor is formed of aluminum casting material (aluminum die-cast material). Therefore, the end rings do not have the required level of rigidity for tolerating the high-speed rotation. The end rings are thus damaged or deformed, hampering the rotation of the induction motor.

To solve this problem, the aforementioned utility model, includes a pair of end plates formed of stainless steel, which presents sufficiently higher rigidity than that of the aluminum casting material. The end plates are attached to opposing ends of the iron core, such that the ends of the aluminum conducting bars are arranged in the corresponding end plate. In this state, aluminum is cast in the end plates for forming the end rings, which are encompassed by the end plates. The end plates thus support the end rings, preventing the end rings from being damaged or deformed.

Further, in order to dispose the aluminum conducting bars are at radial outward positions in the core, the end rings connecting the ends of the aluminum conducting bars must be enlarged in a radial outward direction. Since the end rings are encompassed by the end plates, the radial outward portion of each end plate with respect to the associated end ring thus has a relatively small radial dimension. Therefore, in order to increase the rigidity of the same portions of the end plates, the end plates are enlarged in the axial direction, as described in the aforementioned utility model publication.

Further, as described in this publication, a portion of the outer peripheral surface of each end of the conducting bars is placed in contact with the associated end plate, such that the radial dimension of each end plate is sufficiently large and the conducting bars are allowed to be placed at the radial outward positions in the iron core. In this structure, the contact area between the outer peripheral surface of each conducting bar and the associated end ring is relatively small. This increases electric resistance between the conducting bars and the end ring. To solve this problem, the end rings are connected to the end surfaces of the conducting bars. The end rings thus become relatively large in the axial direction, making it further necessary to enlarge the end plates in the axial direction.

Since the axially large end rings are relatively heavy, the total weight of the rotor is increased. Therefore, if the rotor is supported by a rotary shaft in a cantilever manner, particularly, as in the aforementioned turbocharger, vibration of the rotor is promoted by the rotor. The rotation of the rotor thus becomes unstable, producing noise.

Also, if the axial dimension of the end plates is enlarged, the rotor as a whole becomes relatively large in the axial direction. The induction motor also becomes relatively large as a whole. Therefore, it is desirable to suppress enlargement of the rotor in terms of the weight and axial dimension, which leads to various problems.

SUMMARY OF THE INVENTION

Accordingly, it is an objective of the present invention to provide a rotor for an induction motor and an induction motor that are relatively light and relatively small in the axial direction.

To achieve the foregoing and other objectives and in accordance with the purpose of the present invention, the invention provides a rotor for an induction motor having a core, a pair of end rings, and a plurality of aluminum conducting members. The core has a plurality of accommodating holes aligned circumferentially in a peripheral portion of the core. The accommodating holes extend from one end surface of the core to the other. The end rings are formed of aluminum alloy. Each of the end rings has a plurality of support holes corresponding to the accommodating holes. The support holes are aligned circumferentially in a peripheral portion of each of the end rings. The end rings are disposed at the opposing ends of the core such that the support holes are opposed to the accommodating holes. Each of the aluminum conducting members is received in a corresponding one of the accommodating holes and the associated support holes. Each conducting member is supported by each end ring at a support portion located in the corresponding support hole.

The invention also provides a rotor for an induction motor including a core, a pair of end rings, and a plurality of aluminum conducting members. The core has a plurality of accommodating holes aligned circumferentially in a peripheral portion of the core. The accommodating holes extend from one end surface of the core to the other. The end rings are formed of rolled material of aluminum alloy. Each of the end rings has a plurality of support holes corresponding to the accommodating holes. The support holes are aligned circumferentially in a peripheral portion of each end ring. The end rings are disposed at the opposing ends of the core such that the support holes are opposed to the accommodating holes. Each of the aluminum conducting members is received through casting in a corresponding one of the accommodating holes and the associated support holes. Each conducting member is connected with the end rings through welding.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will hereafter be described with reference to the attached drawings.

Figure 1:
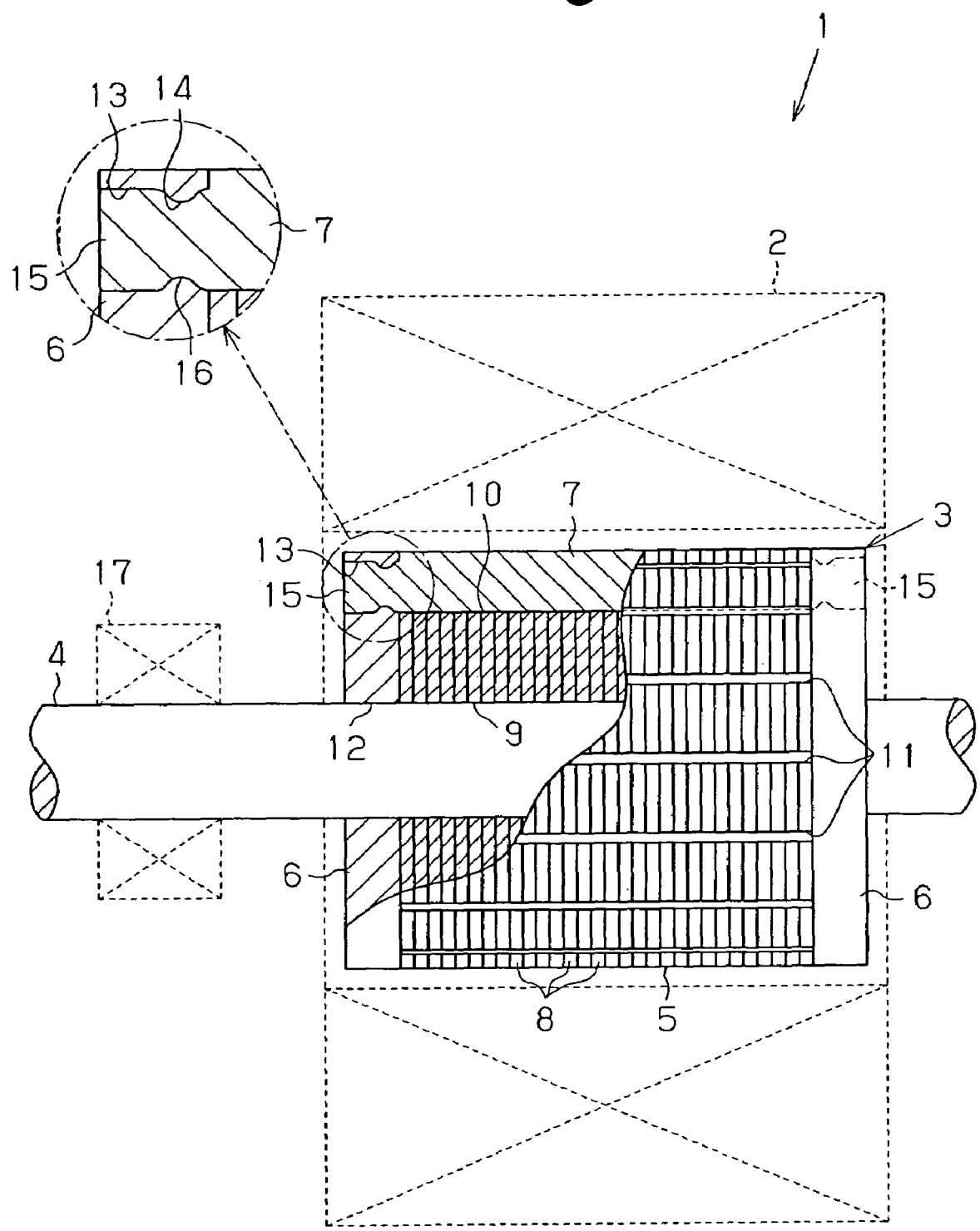
FIG. 1(a) is a cross-sectional view showing a main portion of a rotor of an induction motor according to an embodiment of the present invention.
FIG. 1(b) is an enlarged cross-sectional view showing a portion of the rotor of FIG. 1(a)

FIG. 1(a) shows an induction motor 1 according to an illustrated embodiment of the present invention. The induction motor 1 includes an annular stator 2 and a cage rotor 3. The stator 2 produces a rotating magnetic field when powered by an external power source. The cage rotor 3 is rotationally supported in the space defined by the stator 2. The magnetic field enables the rotor 3 to rotate. The cage rotor 3 includes a rotary shaft 4, a core 5, a pair of end rings 6, and a plurality of aluminum conducting members 7.

Figure 2:
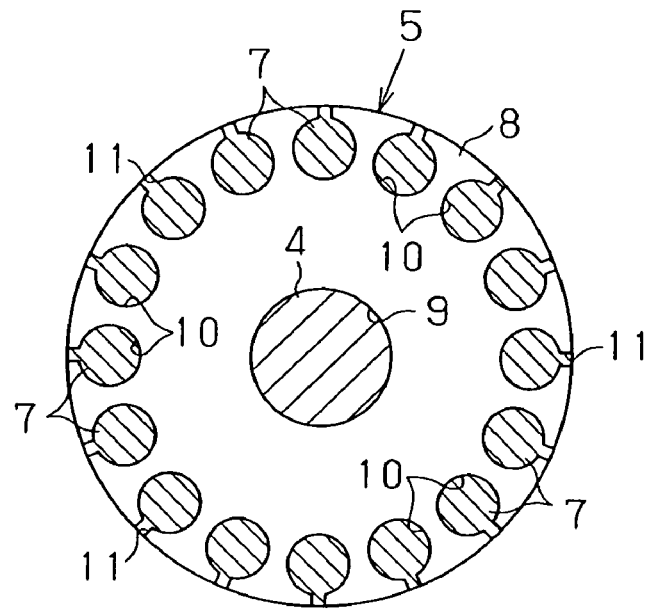
FIG. 2 is a cross-sectional view showing a core according to the illustrated embodiment of the present invention.

The core 5 is formed by laminating a plurality of substantially disk-like core sheets 8, each of which is formed of a silicon steel sheet. The core 5 thus has a substantially columnar shape. As illustrated in FIG. 2, a shaft hole 9 extends though the middle portion of each of the core sheets 8. The cross-sectional shape of the shaft hole 9 is circular, and the rotary shaft 4 is passed through the shaft hole 9. A plurality of (in this embodiment, sixteen) accommodating holes 10 each having a substantially circular cross-sectional shape are formed in a peripheral portion of each core sheet 8. The accommodating holes 10 are aligned circumferentially along a circle defined around the center of each core sheet 8 (the shaft hole 9) and are spaced from adjacent ones at equal intervals. Further, a slit 11 is defined in each of the shaft holes 10 such that the shaft holes 10 open radially outward in the core sheets 8. The core 5 is formed by laminating the core sheets 8 such that the slits 11 extend parallel with the axis of the core 8. The core 5 is then completed by fixing the core sheets 8 together. In complete form, the shaft hole 9 and the accommodating holes 10 extend axially through the core 5 from one end surface of the core 5 to the other. Afterwards, the rotary shaft 4, which has a columnar-like shape, is pressed into (or shrink-fitted to) the shaft hole 9 of the core 5. The core 5 is thus fixed to the rotary shaft 4.

The end rings 6 are identically shaped. The end rings 6 are arranged at the opposing axial ends of the core 5. Each of the end rings 6 has a substantially disk-like shape. The diameter of the end rings 6 is equal to that of the core sheets 8 forming the core 5. The axial dimension of the end rings 6 is larger than that of the core sheets 8 in accordance with a predetermined difference. Each end ring 6 is formed by pressing or cutting an aluminum alloy plate, which has rigidity sufficiently larger than (twice or more as large as) that of the material of the conducting members 7.

Figure 3:
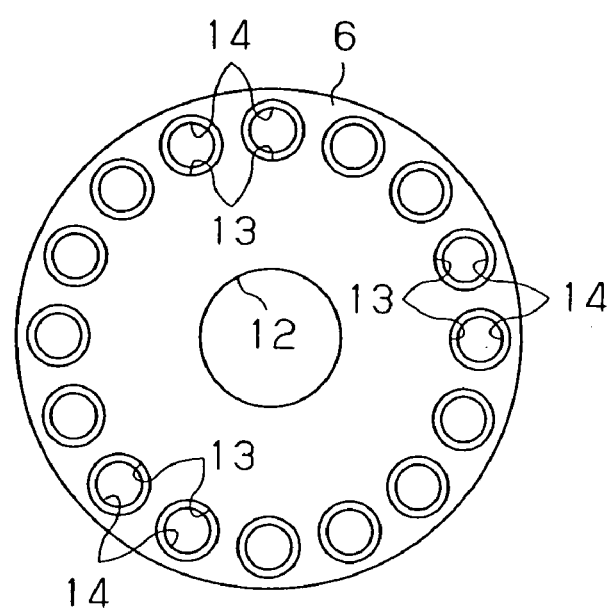
FIG. 3 is a plan view showing an end ring according to the illustrated embodiment of the present invention.

With reference to FIG. 3, a shaft hole 12 having a circular cross-sectional shape extends through the middle portion of each of the end rings 6. The rotary shaft 4 is passed through the shaft holes 12. The diameter of the shaft holes 12 is equal to that of the shaft hole 9 of the core 5. A plurality of (in this embodiment, sixteen) support holes 13 each having a circular cross-sectional shape are formed in a peripheral portion of each end ring 6. The support holes 13 are aligned circumferentially along a circle around the center of each end ring 6 (the shaft hole 12) and are spaced from adjacent support holes 13 at equal intervals. The diameter of the support holes 13 is equal to that of the accommodating holes 10 of the core 5, except for a portion of each support hole 13 including an engaging projection 14, which will be described later. The support holes 13 do not open radially outward in the end rings 6. The support holes 13 support the aluminum conducting members 7. In each of the support holes 13, the engaging projection 14, which serves as an engaging projection projecting radially inward, is formed in an annular manner, or circumferentially along a portion of each support hole 13 relatively close to the core 5. The engaging projections 14 have an arcuate cross-sectional shape. Each end ring 6 is abutted by the associated end surface of the core 5 such that the support holes 13 are opposed to the accommodating holes 10 of the core 5. The rotary shaft 4 is then pressed into (shrink-fitted) the shaft holes 12 of the end rings 6. The end rings 6, together with the core 5, are thus fixed to the rotary shaft 4.

With the core 5 and the end rings 6 fixed to the rotary shaft 4, aluminum casting material is cast in the accommodating holes 10 and the support holes 13 (including the slits 11), until the holes 10, 13 are full, for forming the aluminum conducting members 7. More specifically, sixteen conducting members 7, which correspond to the number of the accommodating holes 10 (the support holes 13), are formed through casting. The conducting members 7 extend parallel with the axis of the core 5 and each include a support portion 15. The conducting members 7 are thus supported by the end rings 6 at the support portions 15, which are located in the corresponding support holes 13.

The aluminum casting material exposed from the slits 11 are cut and removed. Further, through casting, the engaging projection 14 of each support hole 13 forms an engaging groove 16 in the support portion 15 of the corresponding conducting member 7. The cross-sectional shape of the engaging grooves 16 is identical to that of the engaging projections 14. Further, the engaging grooves 16 are formed circumferentially in the conducting members 7 to form an annular shape. The engaging projections 14 are thus engaged with the corresponding engaging grooves 16. As a result, the conducting members 7 are supported by the end rings 6 at the support portions 15 along the axial direction. In this manner, the aluminum conducting bars 7 and the end rings 6 are connected together in a cage-like shape, thus forming the cage rotor 3.

The cage rotor 3 is rotationally supported in the space defined by the stator 2. The induction motor 1 of the illustrated embodiment is thus completed. The induction motor 1 is used in, for example, a turbocharger for a vehicle. The induction motor 1 assists supercharging operation by means of exhaust gas and generates power through the energy produced by the exhaust gas. In this case, the rotary shaft 4 is supported by a bearing 17 in a cantilever manner, and the induction motor 1 is subjected to high-speed rotation exceeding 100,000 rpm.

The characteristic operational effects of the rotor 3 used in the induction motor 1 of the illustrated embodiment will now be explained.

(1) For forming the rotor 3 of the induction motor 1, the end rings 6, which are formed of aluminum alloy, are arranged at the opposing ends of the core 5 such that the accommodating holes 10 of the core 5 are opposed to the support holes 13 of the end rings 6. The aluminum conducting members 7 are then formed in the support holes 13 and the accommodating holes 10 through casting. The conducting members 7 are supported by the end rings 6 at the support portions 15, which are located in the corresponding accommodating holes 13. The rotor 3 of the induction motor 1 is thus completed.

As described above, the end rings 6 of the rotor 3 are formed of aluminum alloy. The end rings 6 thus have relatively high rigidity, as compared to a conventional end ring formed through aluminum casting. This makes it unnecessary to use an end plate formed of stainless steel for reinforcing the end rings 6. In other words, there is no need for adding a member that is relatively heavy and axially large. Further, since the axial dimension of the end rings 6 is relatively small, the support area between each of the conducting members 7 and each of the end rings 6, which are formed of the same material, becomes relatively large. The electrical resistance between each end ring 6 and each conducting member 7 becomes thus relatively small, resulting in improvement of the electric characteristics. In this manner, the end rings 6 are prevented from becoming larger axially and relatively heavy. The rotor 3 as a whole thus becomes relatively light and smaller axially, suppressing enlargement of the induction motor 1 in terms of weight and the axial dimension.

(2) In the illustrated embodiment, the rotary shaft 4, which is fixed to the rotor 3, is supported by the bearing 17 in a cantilever manner. This structure may cause the rotary shaft 4 of the rotor 3 to become axially offset, or inclined when rotating. However, since the rotor 3 is relatively light and smaller axially, as described above, the vibration of the rotor 3 is minimized. In other words, the present invention is particularly advantageous in an induction motor 1 of the illustrated embodiment, in which the rotary shaft 4 is supported by the bearing 17 in a cantilever manner.

(3) Since each of the end rings 6 of the illustrated embodiment is formed from an aluminum alloy plate, the end rings 6 have relatively high rigidity.

(4) The aluminum alloy plate, which forms each end ring 6, has rigidity higher than that of the aluminum conducting members 7. Therefore, a radial outward portion of the end ring 6 with respect to the support holes 13 has relatively high rigidity. This portion of each end ring 6 thus becomes relatively small in terms of the radial and axial dimensions. In other words, each end ring 6 as a whole becomes relatively small in the radial and axial dimensions, reducing the total weight of the end rings 6.

(5) In the illustrated embodiment, the support holes 13 of the end rings 6 do not open radially outward. Therefore, the rigidity of the portion of each end ring 6 in the vicinity of the support holes 13 is enhanced.

(6) In each of the support holes 13 of the illustrated embodiment, the engaging projection 14 projects radially inward and is engaged with the support portion 15 of the corresponding conducting member 7. As described above, when the rotor 3 is supported in the cantilever manner, the rotary shaft 4 of the rotor 3 may become axially offset. If this is the case, the rotation path of each end ring 6, which is attached to the corresponding end of the core 5, also becomes axially offset. In this state, force acts on the end rings 6 in a direction to be separated from the core 5 and the aluminum conducting members 7. However, in the illustrated embodiment, the support portion 15 of each conducting member 7 is engaged with the engaging projection 14 of the corresponding support hole 13 of the end ring 6. Therefore, although the end rings 6 are urged to be separated from the core 5 and the conducting members 7, the end rings 6 are prevented from becoming offset with respect to the core 5 and the conducting members 7 or falling from the core 5 and the conducting members 7. Further, the support area between each of the end rings 6 and the conducting members 7 is increased by the engagement between the support portions 15 of the conducting members 7 and the engaging projections 14 of the support holes 13 of the end rings 6. This structure minimizes the electrical resistance between the end rings 6 and the conducting members 7. Further, the engaging projections 14 increase the radial dimension of the radial outward portion of each end ring 6 with respect to the conducting members 7. The rigidity of the end rings 6 is thus improved.

(7) In the illustrated embodiment, the engaging projection 14 of each of the support holes 13 is located at the position relatively close to the core 5. The axial dimension of each conducting member 7 thus becomes sufficiently large at the portion from the support portion 15, which is engaged with the corresponding engaging projection 14, to the corresponding end of the support hole 13. This improves the rigidity of the support portions 15, thus preventing the support portions 15 from being damaged.

(8) In the illustrated embodiment, the engaging projection 14 of each support hole 13 has an arcuate cross-sectional shape. This disperses the reactive force acting on the engaging projection 14, preventing the engaging projection 14 from being damaged.

(9) The aluminum conducting members 7 of the illustrated embodiment are aligned parallel with the axis of the core 5. If the conducting members 7 are inclined, or skewed, with respect to the axis of the core 5, the axial cross-sectional area of the conducting members 7 becomes relatively small. The conducting members 7 are thus easily damaged when load is applied to the conducting members 7 in an axial direction. In contrast, if the conducting members 7 are aligned parallel with the axis of the core 5, the axial cross-sectional area of the conducting members 7 becomes relatively large. Therefore, although load is applied to the conducting members 7 in the axial direction, the conducting members 7 are hardly damaged.

It should be apparent to those skilled in the art that the present invention may be embodied in many other specific forms without departing from the spirit or scope of the invention. Particularly, it should be understood that the invention may be embodied in the following forms.

In the illustrated embodiment, the engaging projections 14, which are formed in the support holes 13 of the end rings 6 for being engaged with the corresponding conducting members 7, have an annular shape. However, the shape of the engaging projections 14 does not necessarily have to be annular. For example, each engaging projection 14 may be provided only at a radial outward position of the corresponding support hole 13 of the end ring 6. Also in this structure, the radial dimension of the end rings 6 is relatively large at the radial outward portion with respect to the conducting members 7, as in the illustrated embodiment. The rigidity of the end rings 6 is thus improved.

Figure 4:
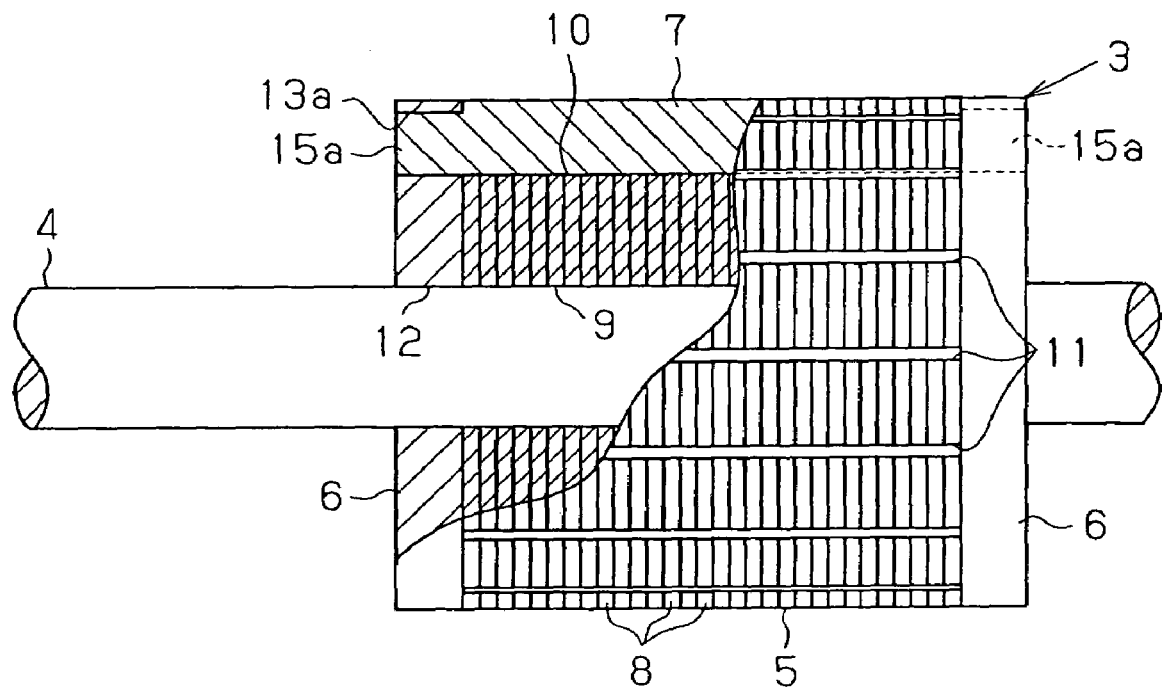
FIG. 4 is a cross-sectional view showing a main portion of a rotor of an induction motor of a modification of the present invention.
Figure 5:
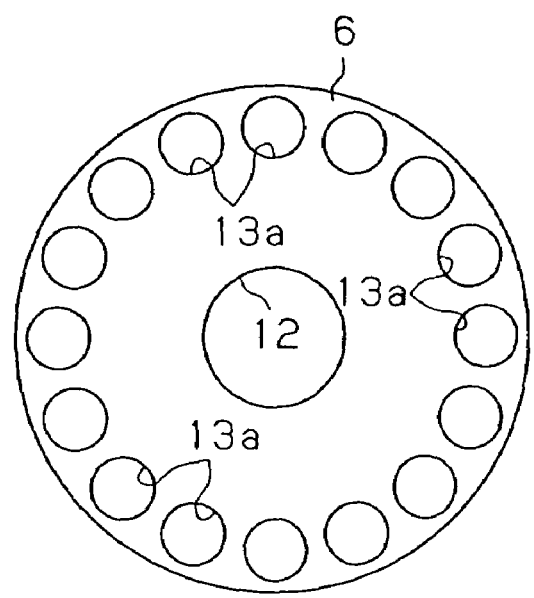
FIG. 5 is a plan view showing an end ring of another modification of the present invention.

Further, although the engaging projections 14 of the illustrated embodiment have an arcuate cross-sectional shape, the cross-sectional shape of the engaging projections 14 may be rectangular. In addition, the engaging projections 14 are located at the positions relatively close to the core 5 in the support holes 13. However, the positions of the engaging projections 14 may be modified as required. Also, with reference to FIGS. 4 and 5, the engaging projections 14 may be omitted. More specifically, a plurality of support holes 13a, each of which has a uniform inner diameter, are formed in each of the end rings 6 in an axial direction. Each of the conducting members 7 has a support portion 15a having a diameter equal to the inner diameter of the support holes 13a. In this case, the conducting members 7 are first formed completely. The conducting members 7 are then passed through the support holes 13a and the accommodating holes 10, such that the support portion 15a of each conducting member 7 is supported by the corresponding support hole 13a.

Figure 6:
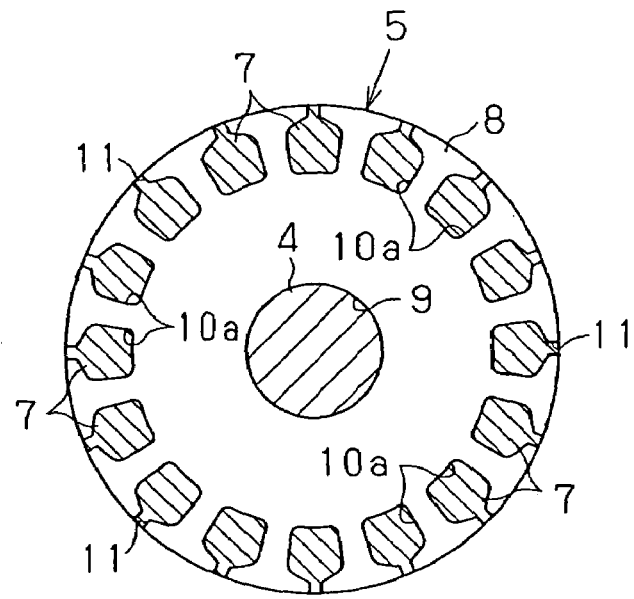
FIG. 6 is a cross-sectional view showing a core of another modification of the present invention.

In the illustrated embodiment, the accommodating holes 10 of the core 5 (the core sheets 8) have a substantially circular cross-sectional shape. However, as illustrated in FIG. 6, a plurality of accommodating holes 10a each having a substantially pentagonal cross-sectional shape may be provided in the core 5.

In the illustrated embodiment, the sixteen conducting members 7 extend through the sixteen accommodating holes 10 of the core 5 and the sixteen support holes 13 of each of the end rings 6. However, the quantity of the conducting members 7 or the accommodating holes 10 or the support holes 13 is not restricted to that of the illustrated embodiment. Further, the positions of the accommodating holes 10 and the support holes 13 may be changed as needed.

Figure 7:
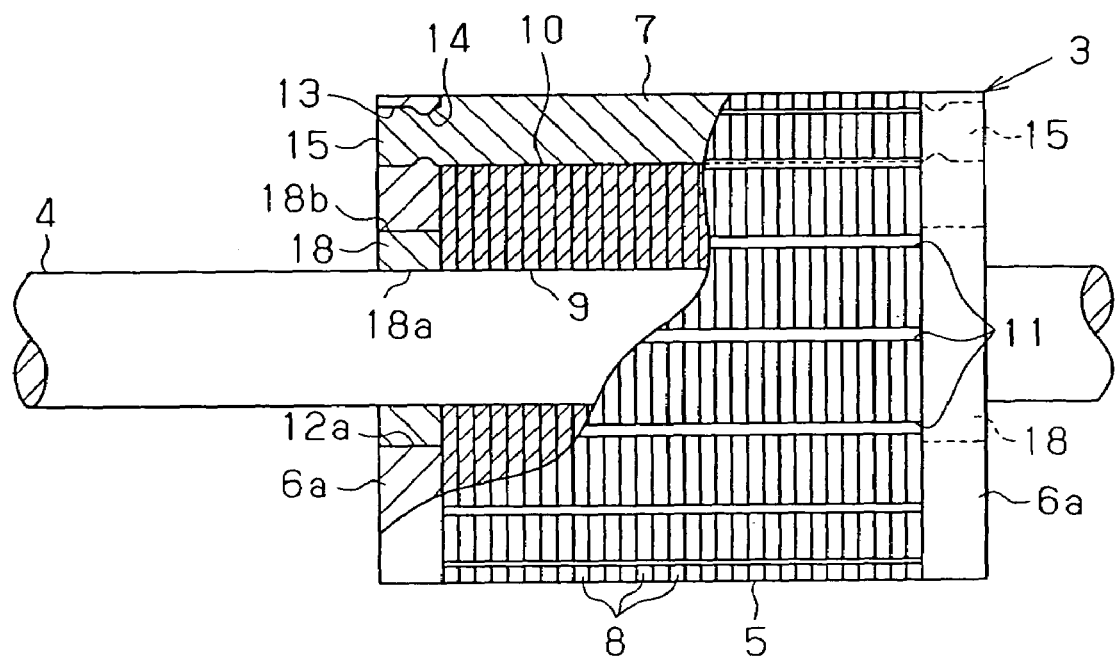
FIG. 7 is a cross-sectional view showing a main portion of a rotor of an induction motor of another modification of the present invention.
Figure 8:
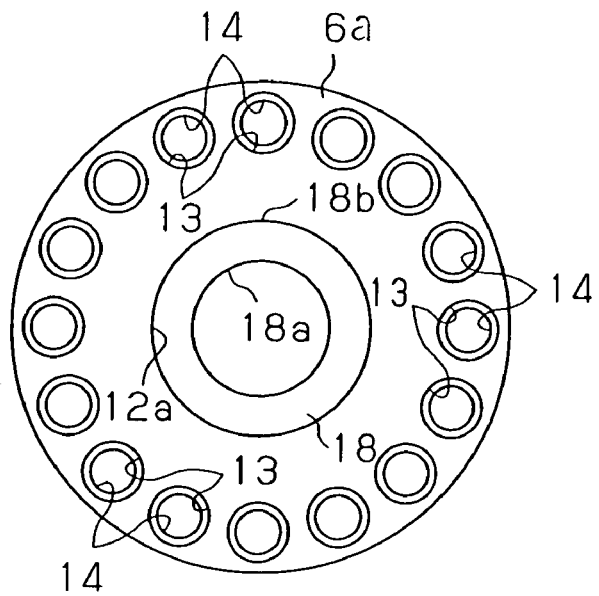
FIG. 8 is a plan view showing an end ring and a fixing ring of another modification of the present invention.

Although the end rings 6 of the illustrated embodiment are fixed directly to the rotary shaft 4, a fixing ring 18 may be provided between each of the end rings 6a and the rotary shaft 4, as shown in FIGS. 7 and 8. More specifically, the fixing rings 18, each of which has an annular shape, are formed of material having a rigidity equal to or higher than that of the core 5 (the core sheets 8), for example, iron. A shaft hole 18a having a circular cross-sectional shape is defined at the middle of each of the fixing rings 18 for receiving the rotary shaft 4. Each of the end rings 6a is securely fitted to an outer peripheral surface 18b of the corresponding fixing ring 18. A fixing hole 12a having a circular cross-sectional shape is defined at the middle of each end ring 6a for receiving the corresponding fixing ring 18. In other words, the fixing rings 18 are fitted and fixed to the rotary shaft 4, and the end rings 6a are fitted and fixed to the corresponding fixing rings 18.

The rigidity of the fixing rings 18 is equal to or higher than that of the core 5 (the core sheets 8). Thus, as compared to the illustrated embodiment in which each end ring 6 is directly fitted to the rotary shaft 4 without employing the fixing rings 18, the fixing strength between the end rings 6a and the rotary shaft 4 is relatively large. Further, the fixing area between the rotary shaft 4 and each of the end rings 6a, which is fitted to the fixing ring 18, is relatively large as compared to the illustrated embodiment. The fixing strength between each end ring 6a and the rotary shaft 4 thus becomes relatively large. Therefore, the end rings 6a are prevented from becoming offset with respect to the core 5 and the conducting members 7 or falling from the core 5 and the conducting members 7. Further, if the rotary shaft 4 is passed through the core 5 with at least the fixing rings 18 attached to the core 5, deformation of the core 5, which may be caused by the rotary shaft 4, is suppressed by the rigidity of the fixing rings 18. The core 5 is thus prevented from being deformed.

Figure 9:
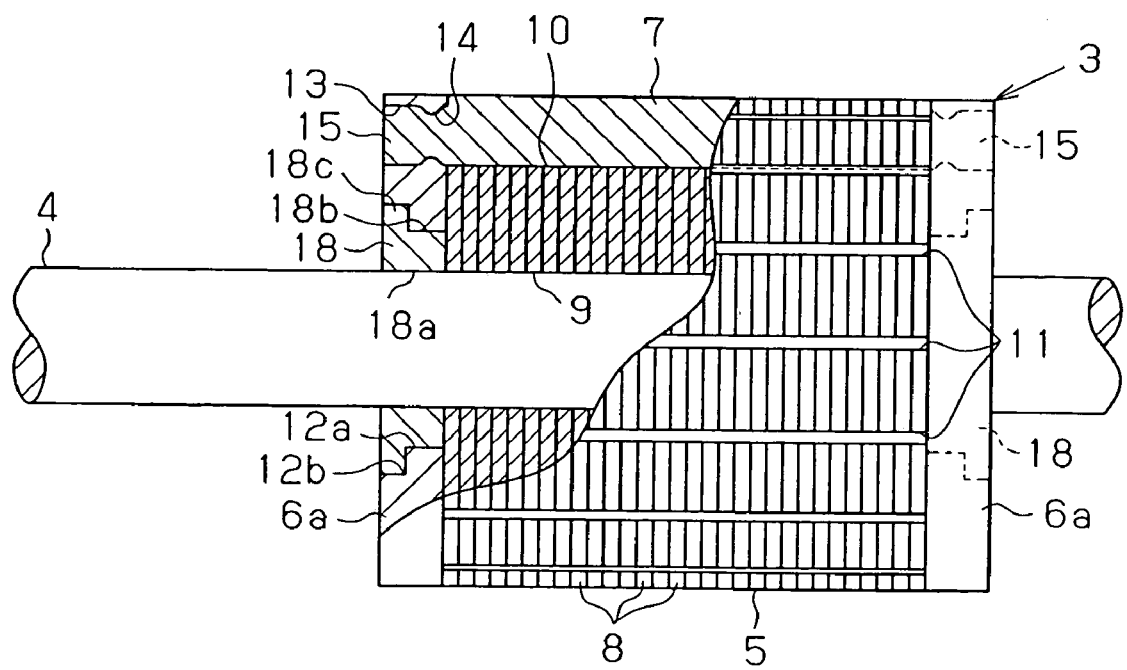
FIG. 9 is a cross-sectional view showing a rotor of an induction motor of another modification of the present invention.

With reference to FIG. 9, a stopper projection 18c may project radially outward from the outer peripheral surface 18b of each fixing ring 18. The stopper portion 18c restricts the movement of each end ring 6a in the direction opposite to the core 5. The stopper projection 18c is formed along the entire circumference or at a circumferential portion of each end ring 6a. A stepped portion 12b is formed in the wall of the fixing hole 12a of each end ring 6a for receiving the corresponding stopper projection 18c. The stepped portions 12b are engaged with the stopper projections 18c to stop the stopper projections 18c from moving in an axial direction. In this manner, although the end rings 6a are urged to be separated from the core 5 and the conducting members 7, the end rings 6a remain engaged with the stopper projections 18c of the fixing rings 18. The movement of the end rings 6a in the direction opposite to the core 5 is thus restricted. The end rings 6a are thus further reliably prevented from becoming offset with respect to the core 5 and the conducting members 7 or falling from the core 5 and the conducting members 7.

Figure 10:
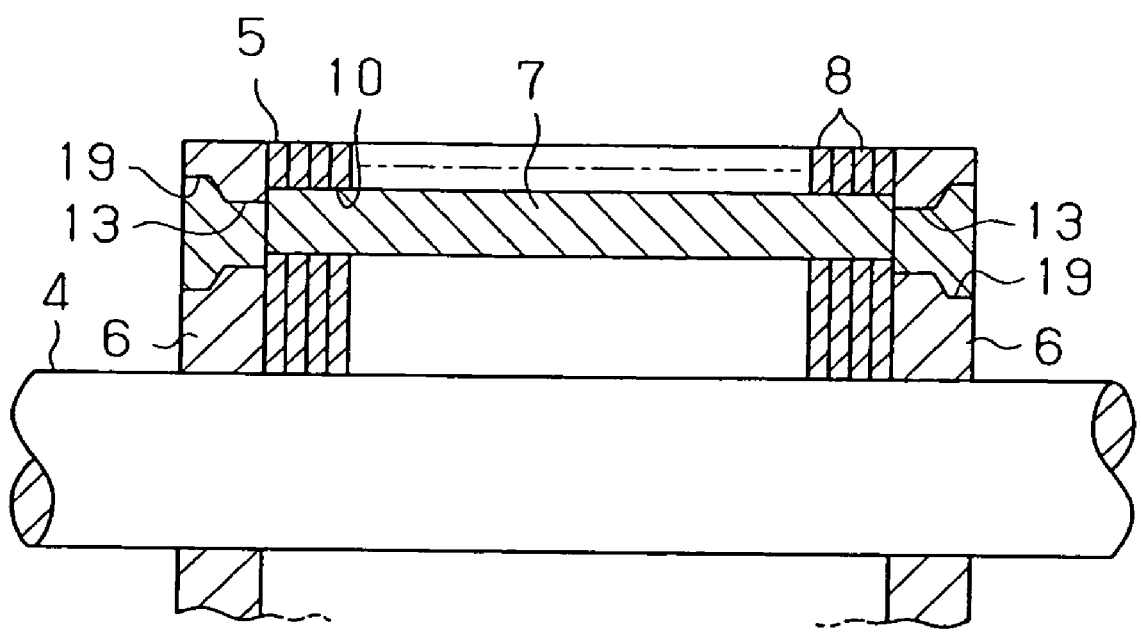
FIG. 10 is a cross-sectional view showing a rotor of an induction motor of a modification of the present invention.

In the modification of FIG. 10, each of the end rings 6 is formed of rolled material of aluminum alloy. The support holes 13 of the end rings 6 are located in an offset radially inward direction with respect to the corresponding accommodating holes 10 of the core 5. Each of the end rings 6 includes a plurality of grooves 19, each of which is defined at the outer periphery of the corresponding support hole 13. The grooves 19 open at the outer side surfaces of the corresponding end rings 6. The grooves 19 are connected with the corresponding support holes 13. The aluminum conducting members 7 are formed through casting in the support holes 13 of the end rings 6, the grooves 19, and the accommodating holes 10 of the core 5. The end rings 6 are thus welded to the core 5 by means of the conducting members 7 at the boundary portions between the end rings 6 and the core 5.

Since the end rings 6 of this modification are formed of rolled material of aluminum alloy, the axial dimension of the end rings 6 becomes relatively small while the rigidity of the end rings 6 is maintained at a relatively high level. Due to the relatively small axial dimension of the end rings 6, the projecting amount of each conducting member 7 from the end surfaces of the core 5 becomes relatively small. This suppresses breakage of the conducting members 7. Further, since the end rings 6 are bonded with the core 5 through welding, the electric resistance between the end rings 6 and the core 5 becomes relatively small. It is thus possible to obtain a relatively small rotor with enhanced rigidity and improved characteristics.

Also, in this modification, each support hole 13 of the end rings 6 is located offset in the radial inward direction with respect to the corresponding accommodating hole 10 of the core 5. It is thus possible to provide the grooves 19 having a relatively large diameter. This structure increases the outer diameter of the end portions of the conducting members 7 corresponding to the grooves 19, as compared to the outer diameter of the intermediate portions of the conducting members 7. The end rings 6 are thus prevented from falling from the core 5. Also, the support area between each conducting member 7 and the corresponding end ring 6 becomes relatively large, thus reducing the electric resistance between the conducting members 7 and the end rings 6. Each support hole 13 does not have undercut sections. Therefore, the end rings 6 may be easily formed by a press.

In the illustrated embodiment, each of the core sheets 8 is formed of a silicon steel sheet. However, each core sheet 8 may be formed of a steel sheet of a different material, other than silicon.

Although the core 5 of the illustrated embodiment is a laminated type consisting of a plurality of core sheets 8, the core 5 may be an integral type. If this is the case, the rotary shaft 4 may be formed integrally with the core 5.

The induction motor 1 of the illustrated embodiment includes the rotary shaft 4 supported by the bearing 17 in the cantilever manner. However, the present invention is not limited to this structure.

In the illustrated embodiment, the induction motor 1 is for use in a turbocharger of a vehicle. However, the induction motor 1 may be employed in different devices, other than a turbocharger.

The present examples and embodiments are to be considered as illustrative and not restrictive and the invention is not to be limited to the details given herein, but may be modified within the scope and equivalence of the appended claims.

The invention claimed is:

1. A rotor for an induction motor, the rotor comprising:
a core having opposing ends and a plurality of accommodating holes aligned circumferentially in a peripheral portion of the core, the accommodating holes extending from the surface of one end of the core to the other;
a pair of end rings formed of aluminum alloy each having a plurality of support holes corresponding to the accommodating holes, the support holes being aligned circumferentially in a peripheral portion of each of the end rings, each end ring being disposed at a corresponding one of the opposing ends of the core such that the support holes are opposed to the accommodating holes; and
a plurality of aluminum conducting members, each of the conducting members being received in a corresponding one of the accommodating holes and the associated support holes, each conducting member being supported by each end ring at a support portion located in the corresponding support hole; wherein each of the end rings is formed of a rolled material of aluminum alloy.

2. The rotor according to claim 1, wherein the rolled material of aluminum alloy has rigidity higher than that of the aluminum conducting members.

3. The rotor according to claim 1, wherein each of the support holes of the end rings is closed at a radial outward position in each of the end rings.

4. The rotor according to claim 1, wherein an engaging projection projecting radially inward is formed at an inner side surface of each support hole of the end rings for becoming engaged with the support portion of the corresponding conducting member.

5. The rotor according to claim 4, wherein the engaging projection of each of the support holes is located relatively close to the core.

6. The rotor according to claim 4, wherein the engaging projection of each support hole has an arcuate cross-sectional shape.

7. A rotor for an induction motor, the rotor comprising:
a core having opposing ends and a plurality of accommodating holes aligned circumferentially in a peripheral portion of the core, the accommodating holes extending from the surface of one end of the core to the other;
a pair of end rings formed of aluminum alloy each having a plurality of support holes corresponding to the accommodating holes, the support holes being aligned circumferentially in a peripheral portion of each of the end rings, each end ring being disposed at a corresponding one of the opposing ends of the core such that the support holes are opposed to the accommodating holes; and
a plurality of aluminum conducting members, each of the conducting members being received in a corresponding one of the accommodating holes and the associated support holes, each conducting member being supported by each end ring at a support portion located in the corresponding support hole;
wherein the rotor is provided with a rotary shaft; and
a pair of fixing rings having rigidity equal to or larger than that of the core is fitted to the rotary shaft, and each end ring is fitted to a corresponding one of the fixing rings.

8. The rotor according to claim 7, wherein each of the fixing rings includes a stopper projection, the stopper projection projecting radially outward for restricting movement of the associated end ring in a direction opposite to the core.

9. The rotor according to claim 1, wherein the aluminum conducting members are aligned parallel with the axis of the core.

10. An induction motor including the rotor according to claim 1 and a stator for generating a rotating magnetic field for enabling the rotor to rotate.

11. The induction motor according to claim 10, wherein a rotary shaft fixed to the rotor is supported by a bearing in a cantilever manner.

12. A rotor for an induction motor, the rotor comprising:
a core having opposing ends and a plurality of accommodating holes aligned circumferentially in a peripheral portion of the core, the accommodating holes extending from the surface of one end of the core to the other;
a pair of end rings formed of rolled material of aluminum alloy, each of the end rings having a plurality of support holes corresponding to the accommodating holes, the support holes being aligned circumferentially in a peripheral portion of each end ring, each end ring being disposed at a corresponding one of the opposing ends of the core such that the support holes are opposed to the accommodating holes; and
a plurality of aluminum conducting members, each of the conducting members being received through casting in a corresponding one of the accommodating holes and the associated support holes, each conducting member being connected with the end rings through welding.

13. The rotor according to claim 12, wherein each of the support holes of the end rings is offset in a radial inward direction with respect to the corresponding accommodating hole of the core.

14. The rotor according to claim 12, wherein:
a plurality of grooves are formed in each of the end rings such that each of the grooves is located around the outer periphery of a corresponding one of the support holes and is connected with the support hole, each groove opening at an outer side surface of each end ring; and
the aluminum conducting members are formed in the grooves through casting.

15. The rotor according to claim 13, wherein:
a plurality of grooves are formed in each of the end rings such that each of the grooves is located around the outer periphery of a corresponding one of the support holes and is connected with the support hole, each groove opening at an outer side surface of each end ring; and
the aluminum conducting members are formed in the grooves through casting.

* * * * *